(12) United States Patent
Graham

(10) Patent No.: US 7,382,713 B2
(45) Date of Patent: Jun. 3, 2008

(54) METHOD AND APPARATUS FOR TONE ARM MAGNETIC STABILIZATION AND DAMPING SYSTEM

(76) Inventor: Robert J. Graham, 7233 Avalon Dr., Wilmington, MA (US) 01887

( * ) Notice: Subject to any disclaimer, the term of this patent is extended or adjusted under 35 U.S.C. 154(b) by 276 days.

(21) Appl. No.: 11/078,233

(22) Filed: Mar. 11, 2005

(65) Prior Publication Data

US 2006/0203695 A1  Sep. 14, 2006

(51) Int. Cl.
*G11B 3/10*  (2006.01)

(52) U.S. Cl. ..................................... 369/252

(58) Field of Classification Search .............. 369/252, 369/255
See application file for complete search history.

(56) References Cited

U.S. PATENT DOCUMENTS

| | | | |
|---|---|---|---|
| 4,023,130 A | 5/1977 | Ridler | |
| 4,066,267 A * | 1/1978 | Kagata | ........................ 369/255 |
| 4,114,895 A | 9/1978 | Eckhart | |
| 4,121,837 A | 10/1978 | Tominari | |
| 4,127,274 A * | 11/1978 | Griffith | ........................ 369/226 |
| 4,170,360 A * | 10/1979 | Ohsawa | ........................ 369/181 |
| 4,170,361 A | 10/1979 | Zwicky | |
| 4,170,362 A | 10/1979 | Zwicky | |
| 4,184,688 A * | 1/1980 | Omura et al. | ................ 369/216 |
| 4,214,757 A * | 7/1980 | Kusaka et al. | ................ 369/43 |
| 4,240,641 A * | 12/1980 | Kimura | .................... 369/53.38 |
| 4,310,918 A * | 1/1982 | Hirata | ..................... 369/215.1 |
| 4,587,646 A | 5/1986 | Graham | |
| 4,686,664 A | 8/1987 | Graham | |

OTHER PUBLICATIONS

Graham Engineering Inc., "The Phantom", URL http:////www.graham-engineering.com/_wsn/page2.html, published Sep. 28, 2004.

* cited by examiner

*Primary Examiner*—William Korzuch
*Assistant Examiner*—Mark Blouin
(74) *Attorney, Agent, or Firm*—Mitchell Chase

(57) ABSTRACT

A unipivot tone arm assembly wherein the tone arm is supported by a single point is balanced in such a way as to have neutral stability providing constant tracking force over the peaks and valleys of phonograph records. Lateral stability lacking in a neutral balanced unipivot tone arm is provided by magnetic coupling between magnets on the tone arm housing assembly and a freely rotating platform. Anti-skate is accomplished through a pulley mechanism between the rotating platform and the tone arm gantry, with the pulley on a counterweighted rotating pivot arm.

13 Claims, 4 Drawing Sheets

METHOD AND APPARATUS FOR TONE ARM MAGNETIC STABILIZATION AND DAMPING SYSTEM

INCORPORATION-BY-REFERENCE OF MATERIAL SUBMITTED ON A COMPACT DISC

Not Applicable

BACKGROUND

The present invention generally relates to tone arm assemblies of the type employed with sound reproduction equipment, such as phonograph assemblies and the like. In particular, the present invention is directed to a novel stabilization and damping system to provide correct geometric stabilization of unipivot tone arm assemblies such as described in U.S. Pat. No. 4,587,646, Tone Arm Assembly, issued May 6, 1986 to this applicant.

A unipivot tone arm assembly is supported on a single pivot bearing assembly having a pivot point coinciding with an imaginary horizontal line extending through a center of gravity of the tone arm assembly, with the horizontal line extending perpendicular to a longitudinal axis extending through the tone arm assembly from a pick-up cartridge position at one end to a counterweight positioned at an opposite end thereof.

Phonograph records, also referred to as Long Playing (LP) records, are cut with a tangential cutting stylus which traverses the recording disk at precisely right angles to the grooves. Ideally, this is also the path that the reproducing tone arm will follow. However, with tangential tone arms, there are related problems regarding mechanical difficulties such as freedom from sticking and adequate energy dissipation in a low-mass system such as is dictated by the typical tangential tracking system.

When playing a warped phonograph record, the tracking force (stylus contact pressure) changes with the vertical position of the tone arm. The effect of these changes is that the stylus tip tracing the phonograph record groove walls changes. This causes an immediate change in the reproduced sound negatively affecting such parameters as frequency response, channel separation and other spatial characteristics etched into the phonograph record groove.

There are three types of balance for a unipivot tone arm assembly: unstable balance; stable balance; and neutral balance. Unstable balance positions the pivot fulcrum below the center of gravity and is unsuitable for any tone arm application. A tone arm with unstable balance will never track properly in the vertical plane. A tone arm with unstable balance will have a decreasing tracking force as the arm is lifted as when playing a warped record. The tone arm will have a tendency to continue traveling upwards at the peak of the warp, possibly even leaving the phonograph record surface entirely, rather than staying in the proper playing position.

Stable balance positions the pivot fulcrum above the center of gravity of the moving system. This kind of balance is useful in scales or other weight measuring systems. With this system any deflection of the moving system creates an immediate and equally strong opposing force with tries to right the assembly to its original rest position. When playing a warped record, the tracking force will constantly change with the vertical position of the tone arm. This in turn will change the stylus rake angle (the angle defined by a vertical line from the centerline of the stylus tip relative to the phonograph record groove) as the suspension mechanism of the cartridge is flexed due to these changing forces. The net effect of this will be that the micro-dimensions of the stylus tip tracing the phonograph record groove walls will also change angle. This will cause an immediate change in the reproduced sound, negatively affecting such functions as frequency response, channel separation and other spatial characteristics etched into the record groove. Unipivot tone arm assemblies are traditionally set to stable balance by adjustment of the counterweights.

Neutral balance, where the pivot point and the center of gravity share a common line, is the preferred method of balance for a tone arm. The up and down motion from the stylus riding over warped phonograph records will not create a strong restoring force with neutral balance. Instead, only the constant, downward tracking gravity-applied force by displacement of the balancing weight will be observed. The stylus contact pressure remains constant regardless of whether the tone arm is tracking a flat phonograph record or one with warps which raises the tone are upward. The stylus rake angle will remain unaffected resulting in more accurate tracking of the grooves. However, with neutral balance there is no restoring force around the lateral axis to maintain proper stylus position with respect to the phonograph record. The lack of lateral stabilization and damping has been the drawback to setting unipivot tone arms in the preferential neutral balance configuration. The present version of this invention provides the lacking lateral stabilization and damping through a novel magnetic stabilization system.

A tone arm with an angled (offset) head shell will exhibit a tendency to swing toward the center of a rotating record. This is caused by the vectors of the rotating forces involved in the overhang (distance of the stylus tip extending past the center of the record) combined with the offset angle. Anti-skate systems are devices which apply a countering force to the tone arm effectively canceling out the natural forces tending to "skate" the arm toward the center. The goal of an anti-skate system is to apply the correct amount of continually changing force at any position on the phonograph record. The magnetic stabilization system provides a unique method of applying anti-skating forces that vary according to the position of the stylus over the phonograph record.

As will become evident from a reading of the following specification and claims, the novel tone arm magnetic stabilization and damping system achieves a method of lateral stabilization achieving neutral balance, as well as anti-skating, and thus avoiding the undesirable effects associated with stable balance.

SUMMARY

The present invention is directed to a method and apparatus that satisfies the need for achieving neutral balance and stabilization for unipivot tone arm assemblies. The apparatus I invented comprises two magnets and a rotatable support member. The first magnet is mounted to the tone arm assembly housing assembly. The second magnet is mounted to a freely rotatable support member, the magnet height and distance from the first magnet may be adjustable to achieve the desired lateral stabilization for neutral balance. The two magnets are aligned along an imaginary horizontal line extending sideways from the housing assembly. The first and second magnets are separated by a gap of air and are not in physical contact. Lateral stabilization is achieved by the attractive magnetic force between the magnets. The support member may use a low friction ball bearing assembly for freer rotation around the fixed tone arm support shaft or assembly base.

The damping system provides an anti-skate mechanism achievable only when coupled with magnetic stabilization. The damping system comprises, in addition to the magnetic stabilization system described, a pulley and a counterweight mounted on a pivoting arm. The pulley wheel is mounted on one end of the pivoting arm, while the counterweight is mounted on an arm perpendicular to the arm containing the pulley. The counterweight force is adjusted by means of moving the counterweight along a rod. The pivoting arm is rotatably mounted to the tone arm gantry. A ball bearing mechanism may be used to reduce friction between the rotatably mounted pivoting arm and the tone arm gantry. The pulley drive system is attached at one end to the tone arm housing assembly and at the other end to the rotatable support member holding the second magnet.

These and other features, aspects, and advantages of the present invention will become better understood with reference to the following description and appended claims.

DESCRIPTION

Figure 1:
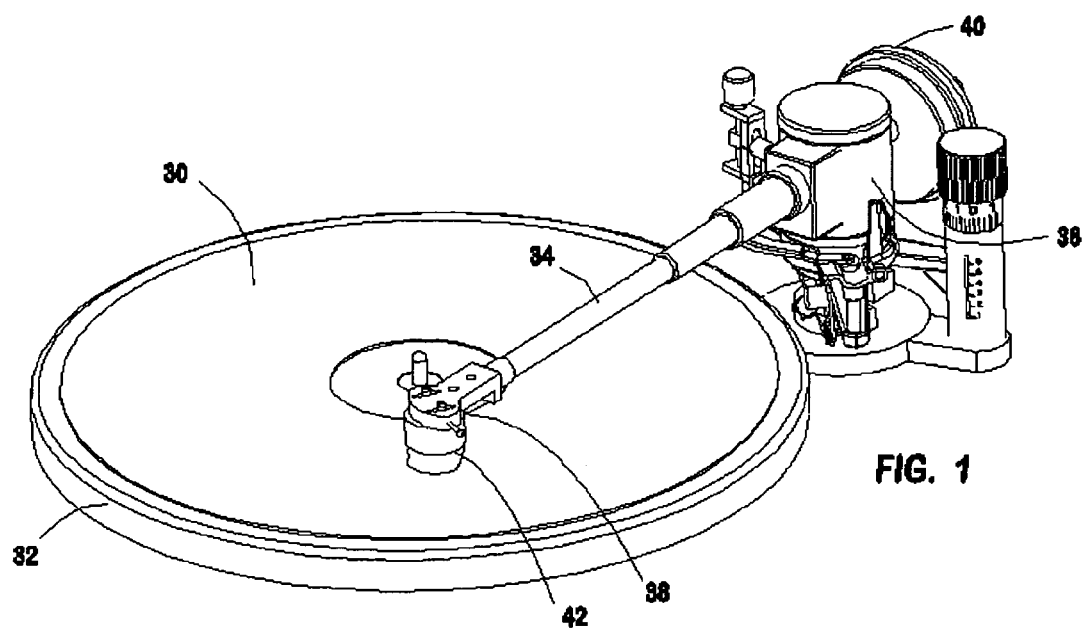
FIG. 1 shows a perspective view of a tone arm assembly and turntable.

A turntable and tone arm assembly are shown in FIG. 1. The phonograph record 30 is placed on a rotating turntable 32. The tone arm assembly comprises a main arm 34 extending from the housing assembly 36. The head shell 38 is on the other end thereof, or front end, of the main arm 34. The head shell 38 contains the phonograph cartridge 42 and stylus that tracks the grooves of the phonograph record 30. A counterweight 40 attached to the housing assembly 36 is used to adjust the main arm 34 so there is no downward force to the phonograph cartridge 42 mounted at the front end of the main arm 34. The main arm 34 will not tend to move up, down, or sideways due to balance effects. If the main arm 34 were raised in an upward direction it would stay in that position even though the bearing surface is extremely smooth and exhibits virtually no friction. The advantage of this is that when playing a warped record the main arm 34 will not exhibit any counter-restoring forces to the upward motion. The main arm 34 will traverse the peaks and valleys of a warped phonograph record 30 with no change in force and will little or no stylus cantilever deflection. However, a unipivot tone arm in neutral stabilization as described has no sideways stabilization and no restoring force to correct for rotational motion about the long axis of the tone length. While neutral balance is desirable in the normal vertical motion of the tone arm system, the lateral motion should be very stable.

Figure 2:
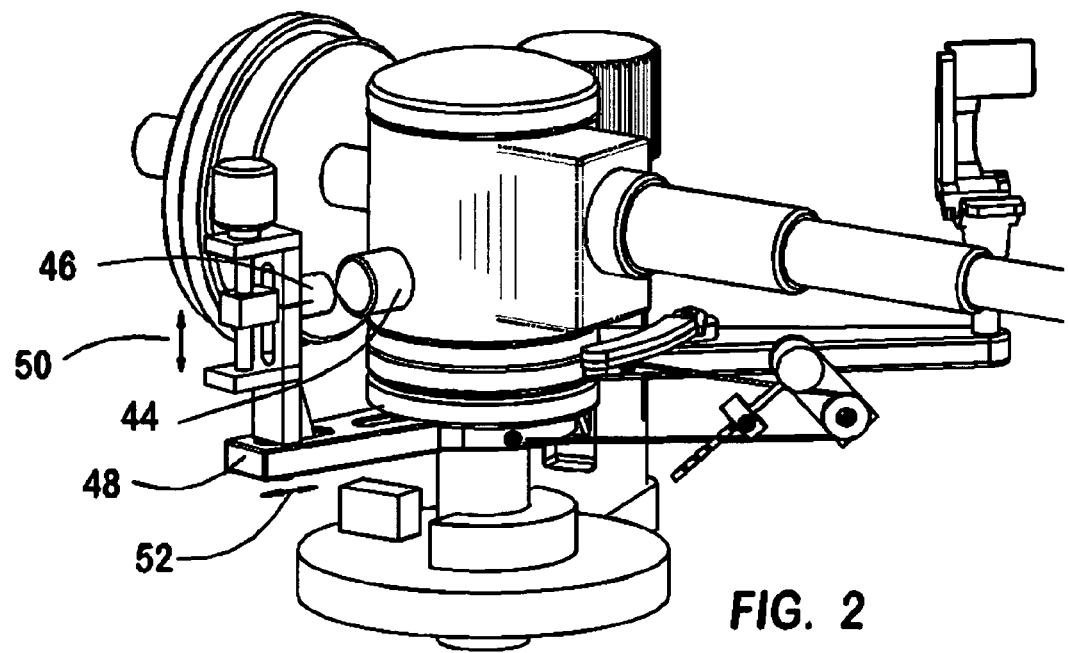
FIG. 2 shows a perspective view of a tone arm with magnetic stabilization and damping system.

FIG. 2 shows the magnetic stabilization and damping system that provides the lateral stabilization and anti-skating for unipivot tone arms in neutral stabilization. The tone arm magnetic stabilization and damping system is comprised of a first magnet 44 attached to the tone arm housing assembly 36 and a second magnet 46 mounted on a support member 48. The tone arm housing assembly 36 pivots on a tone arm base thereby allowing rotation around a vertical axis and a horizontal axis. The second magnet 46 is aligned along a horizontal line extending sideways from the housing assembly 36 by the vertical position mechanism 50. The horizontal distance between the two magnets across an air gap is set by the horizontal position mechanism 52.

Figure 3:
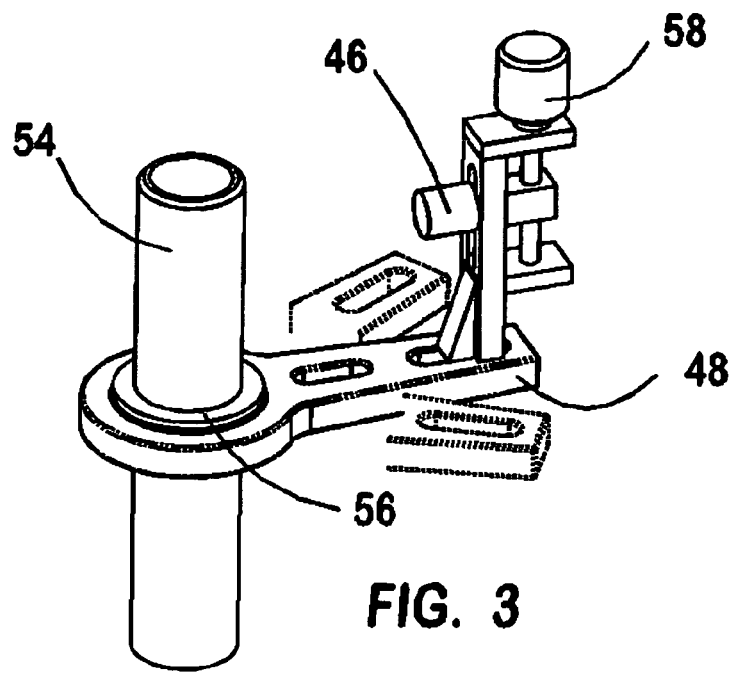
FIG. 3 shows a perspective view of the rotatable support and second magnet adjustment mechanisms.

Referring to FIG. 3, the support member 48 rotates around the fixed tone arm base 54 with freely rotating means 56. The tone arm housing assembly 36 is mounted atop the tone arm base 54.

Figure 4:
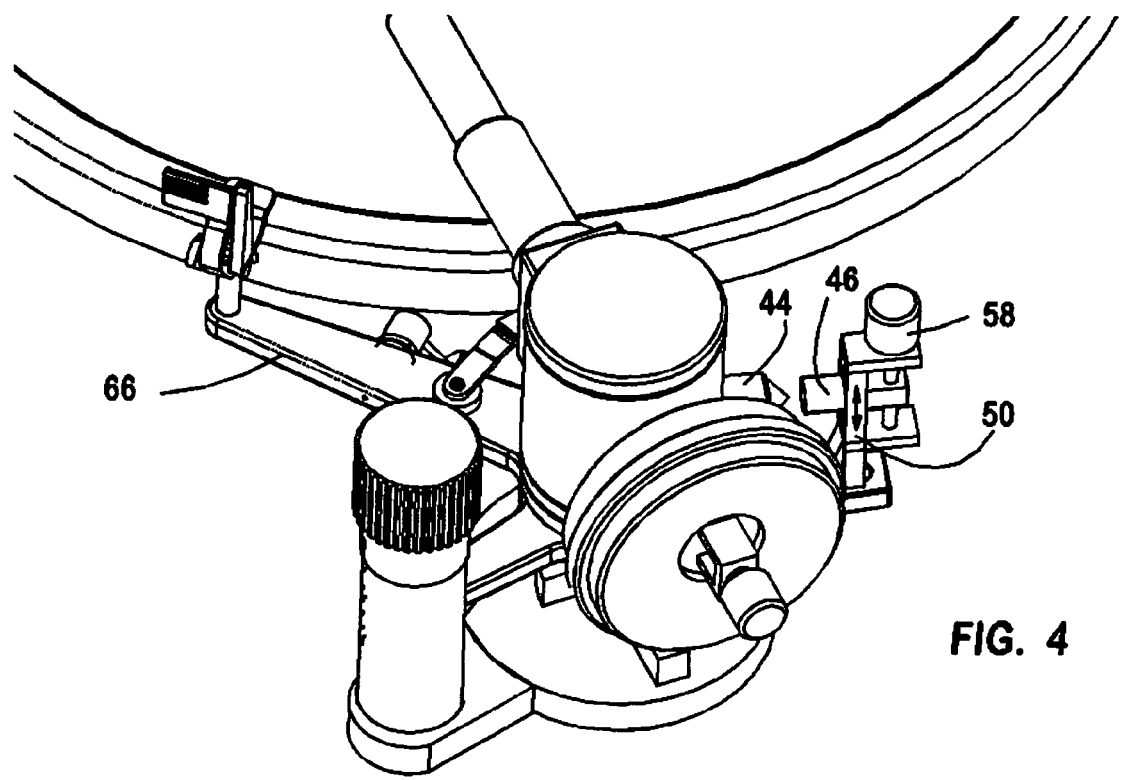
FIG. 4 shows a perspective view from the upper rear of the housing assembly and magnetic stabilization.

The horizontal separation between the first magnet 44 and the second magnet 46 is shown in FIG. 4. The second magnet 46 vertical adjustment 46 is controlled by vertical adjustment 58.

Figure 5:
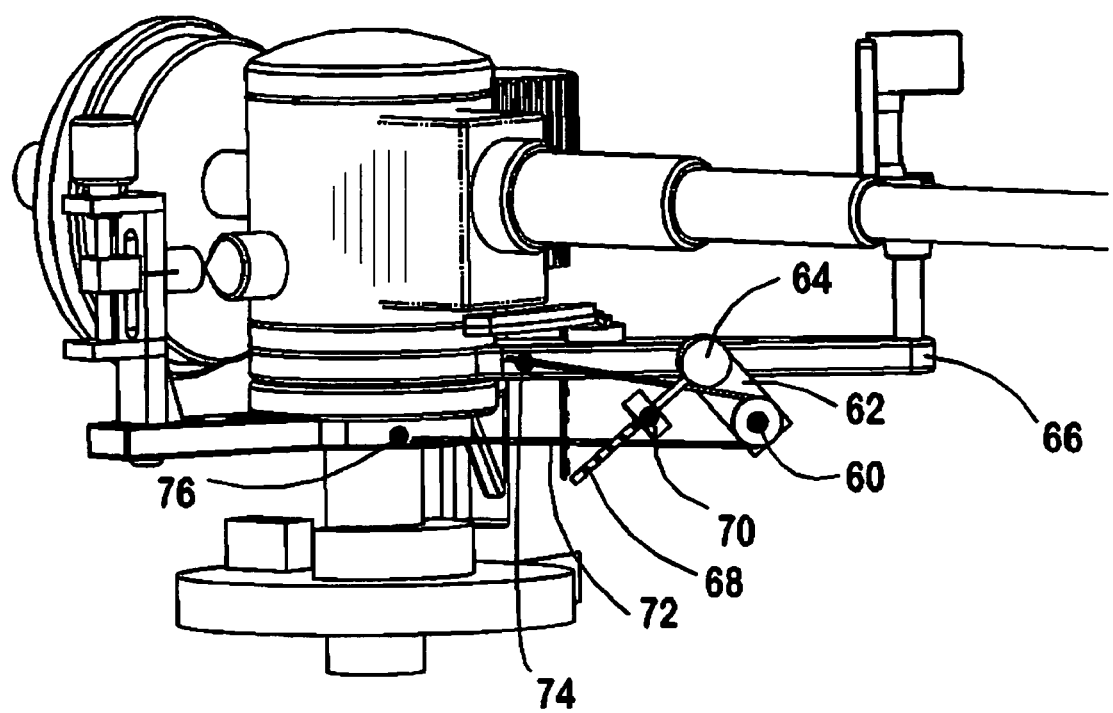
FIG. 5 shows a perspective side view of the anti-skating mechanism.
Figure 6:
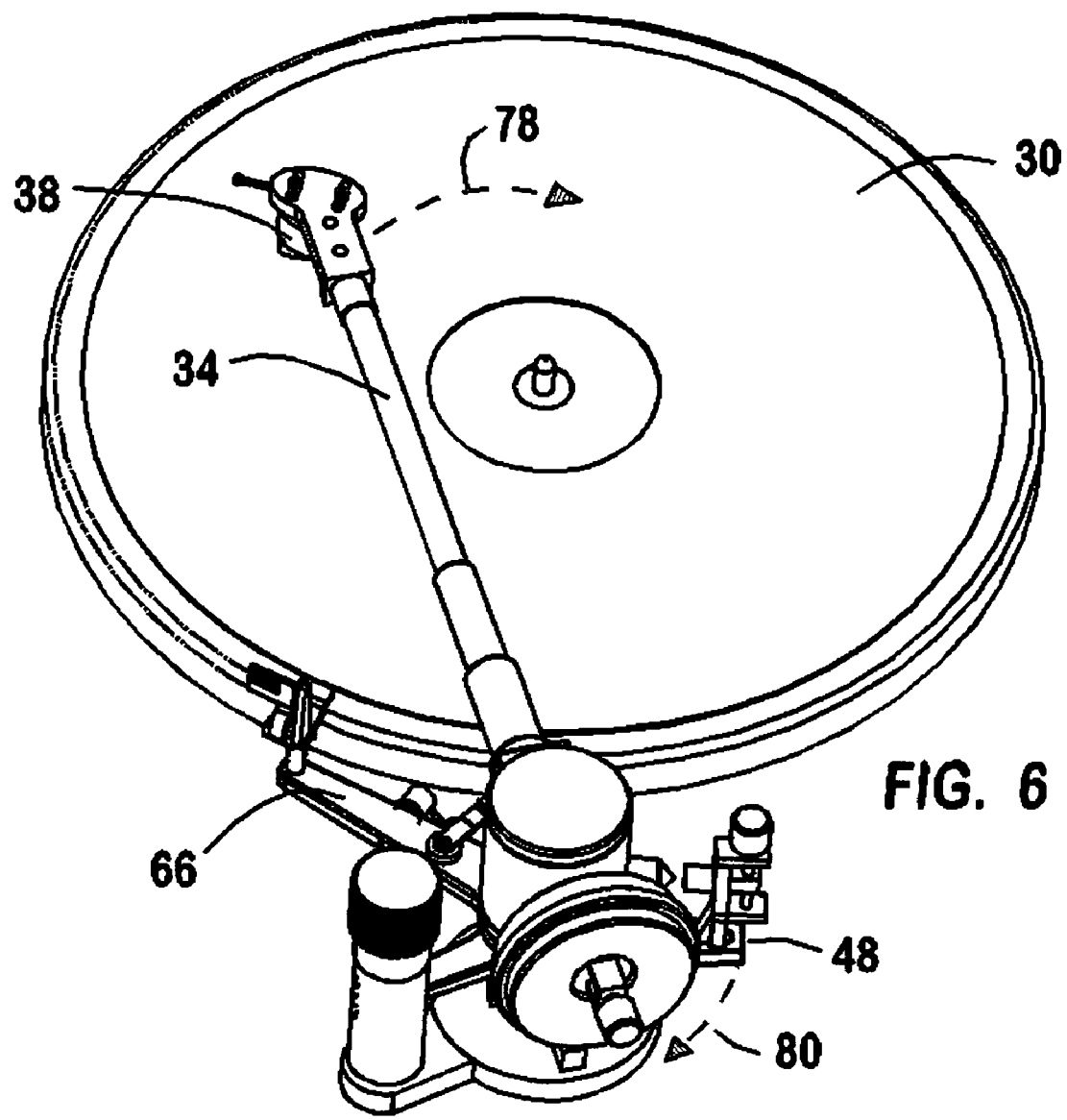
FIG. 6 shows a perspective view of the operation of a version of the invention

FIG. 5 shows the anti-skating mechanism. The pulley wheel 60 is mounted on the pivoting arm 62. The pivot point 64 is rotatably mounted to the tone arm gantry 66. Extending from the pivot point 64 approximately perpendicularly to the pivoting arm 62 is a rod 68 containing a counterweight 70. The rod 68 may contain calibrated markings to aid is precise positioning of the counterweight 70. The pulley drive belt 72 attaches on one end 74 to the tone arm gantry 66 and at the other end 76 to the rotatable support member 48.

The first magnet 44 shape can be cylindrical, cubic, cup, channel or generally any polyhedron. The surface of the first magnet 44 facing the second magnet 46 can be flat, rounded, conic or any even or uneven surface. The first magnet 44 can be a permanent magnet made from one of the following materials: (a) rare earth materials such as neodymium, samarium cobalt or other rare earth materials; (b) ceramics or ferrites; (c) alnico (aluminum, nickel and cobalt), or; (d) other magnetic materials presently existing or developed in the future that performs the same function. The function of the first magnet 44 is to provide an attractive force that has a pulling effect on the second magnet 46. The first magnet 44 is not in physical contact with the second magnet 46. The first magnet 44 is coupled to the housing assembly 36 by attachment means such as an adhesive, mounting bracket, magnetic attraction or any structure presently existing or developed in the future that performs the same attachment function.

The second magnet 46 shape can be cylindrical, cubic, cup, channel or generally any polyhedron. The surface of the second magnet 46 facing the first magnet 44 can be flat, rounded, invert conic or any even or uneven surface. The second magnet 46 can be a permanent magnet made from one of the following materials: (a) rare earth materials such as neodymium, samarium cobalt or other rare earth materials; (b) ceramics or ferrites; (c) alnico (aluminum, nickel and cobalt), or; (d) other magnetic materials presently existing or developed in the future that performs the same function. The function of the second magnet 46 is to provide an attractive force that has a pulling effect on the first magnet 44. The second magnet 46 is separated by an air gap and not in physical contact with the first magnet 44. The second magnet 46 is coupled to the support member 48 by attachment means such as an adhesive, mounting bracket, magnetic attraction or any structure presently existing or developed in the future that performs the same attachment function. The second magnet 46 orients along a horizontal line extending sideways from the housing assembly 36 and through the first magnet 44 by the attraction forces of the magnetic flux. The vertical position 50 of the second magnet 46 is set by a vertical adjustment mechanism. The vertical adjustment mechanism can be a screw-type mechanism, a set-screw mechanism, a gear mechanism, or other mechanism presently existing or developed in the future that performs the same function. The horizontal adjustment 52 controls the strength of the attractive magnetic force asserted on the first magnet 44. The horizontal distance is set by a horizontal adjustment mechanism. The horizontal adjustment mechanism can be a screw-type mechanism, a set-screw mechanism, a gear mechanism, a friction mechanism or other mechanism presently existing or developed in the future that performs the same function.

The support member 48 has a horizontal cylindrical end and a vertical support at the other end. The support member 48 can taper from the cylindrical end to the vertical support end or be in any shape that supports the vertical end. The vertical end position along the horizontal surface is adjustable. The sipport member 48 can be made of metallic or non-metallic materials. Examples of metallic materials include, but are not limited to, aluminum, bronze, steel and other similar products. Examples of non-metallic materials include, but are not limited to, plastics, fiberglass and similar products. The function of the support member 48 is to provide a support for the second magnet 46 that freely rotates around the tone arm base 54 while providing a stable vertical alignment with the first magnet 44 and a stable horizontal distance from the first magnet 44. The rotation means around the tone arm base 54 can be provided by a ball-bearing mechanism, or other low-friction rotation means presently existing or developed in the future to perform the same function.

The pulley consists of a pulley wheel 60 attached to a pivot arm 62. The pulley wheel 60 freely rotates around the pulley wheel axle that attaches to the pivot arm 62. Any metallic or non-metallic material can be used for the pulley wheel 60. The pulley drive belt 72 rides on the pulley wheel 60 and attaches to the tone arm gantry 66 at attachment point 74. The other end of the drive belt 72 attaches to the support member 48 at attachment point 76. Attachment points 74 and 76 can be screws, loops or other device to secure the drive belt ends. The drive belt 72 can be a band, belt, cord, rope, chain or similar material. The pulley system applies a lever-activated anti-skate mechanism that applies a distance-variable restoring weight to the tone arm.

The pivot arm 62 is a rectangular shape with squared or rounded ends. Any metallic or non-metallic material that provides sufficient support can be used for the pivot arm 62. The pivot wheel 60 attaches to one end of the pivot arm 62. The pivot point 64 attaches to the other end of the pivot arm 62 and attaches the pivot arm 62 to the tone arm gantry 66 by rotation attachment means. The rotation attachment means can be a ball-bearing assembly or other low-friction mechanism presently existing or developed in the future to perform the same function. Extending from the pivot point 64 approximately perpendicular to the pivot arm 62 is a calibrated rod 68. A counterweight 70 is attached to the calibrated rod 68 by slideable attachment means. The slideable attachment means provides for adjustment of the position of the counterweight 70 along the calibrated rod 68 and securely holding the counterweight 70 in the desired position by set-screw, friction or other attachment mechanism presently existing or developed in the future to perform the same function.

The pivot arm 62 is a rectangular shape with squared or rounded ends. Any metallic or non-metallic material that provides sufficient support can be used for the pivot arm 62. The pivot wheel 60 attaches to one end of the pivot arm 62. The pivot point 64 attaches to the other end of the pivot arm 62 and attaches the pivot arm 62 to the tone arm gantry 66 by rotation attachment means. The rotation attachment means can be a ball-bearing assembly or other low-friction mechanism presently existing or developed in the future to perform the same function. Extending from the pivot point 64 approximately perpendicular to the pivot arm 62 is a rod 68. A counterweight 70 is attached to the rod 68 by moveable attachment means. The moveable attachment means provides for adjustment of the position of the counterweight 70 along the rod 68 and securely holding the counterweight 70 in the desired position by set-screw, friction or other attachment mechanism presently existing or developed in the future to perform the same function.

The invention is used to provide lateral stability and damping for a unipivot tone arm placed in a neutral balance configuration by adjustment of the tone arm counterweight(s). Lateral stabilization is provided by the angle or azimuth of the attractive magnetic forces between the first magnet 44 mounted on the tone arm housing assembly 36 and the second magnet 46 mounted on the vertical portion of the support member 48. The strength of the magnetic attraction force is controlled by the horizontal adjustment 52 for the given tone arm and magnets.

Anti-skate is controlled by a pulley with the pulley wheel 60 mounted on a pivot arm 62 that rotates around the pivot point 64 attached to the tone arm gantry 66. The amount of anti-skating force is controlled by the placement of the counterweight 70 along the rod 68 extending from the pivot point 64 approximately perpendicularly to the pivot arm 62.

The tone arm gantry 66 remains in a fixed position as the tone arm swings 78 toward the phonograph record 30 center. The anti-skate systems pulley is mounted on the tone arm gantry 66. One end of the pulley drive belt 72 attaches to the tone arm gantry 66 at attachment point 74. The other end of the drive belt 72 attaches to the support member 48 at attachment point 76 which rotates with the main arm 34 through magnetic coupling as the tone arm swings 78 toward the center of phonograph record 30. The pulley system mounted on a counterweighted pivoting arm provides a variable anti-skate force that is proportional to the position of the tone arm on the phonograph record. A given distance x traveled by the tone arm pivot will result in a ½ x distance of the anti-skate system. This allows the restoring counterweight 70 of the calibrated rod 68 on the pivot point 64 to follow the 10% to 12% change in force required by the phonograph record 30. The weight will apply slightly more force as the arm sweeps 78 toward the center than when the arm is near the outer edge of the phonograph record. The pulley system, which travels at ½ the rate of the main arm 34 applies an opposite force to the natural skate force of the stylus tip and phonograph record surface interface and effectively neutralizes the effects of skating. This keeps the magnetic circuit of the phonograph cartridge in the preferred center or neutral position for optimal tracking and signal generation.

The tone arm gantry 66 remains in a fixed position as the tone arm swings 78 toward the phonograph record 30 center. The anti-skate systems pulley is mounted on the tone arm gantry 66. One end of the pulley drive belt 72 attaches to the tone arm gantry 66 at attachment point 74. The other end of the drive belt 72 attaches to the support member 48 at attachment point 76 which rotates with the main arm 34 through magnetic coupling as the tone arm swings 78 toward the center of phonograph record 30. The pulley system mounted on a counterweighted pivoting arm provides a variable anti-skate force that is proportional to the position of the tone arm on the phonograph record. A given distance x traveled by the tone arm pivot will result in a ½ x distance of the anti-skate system. This allows the restoring counterweight 70 of the rod 68 on the pivot point 64 to follow the 10% to 12% change in force required by the phonograph record 30. The weight will apply slightly more force as the arm sweeps 78 toward the center than when the arm is near the outer edge of the phonograph record. The pulley system, which travels at ½ the rate of the main arm 34 applies an opposite force to the natural skate force of the stylus tip and phonograph record surface interface and effectively neutralizes the effects of skating. This keeps the magnetic circuit of the phonograph cartridge in the preferred center or neutral position for optimal tracking and signal generation.

The tone arm magnetic stabilization and damping system provides strong damping force about the rotational axis of the main arm 34 approaching that of a fixed bearing design but with the low-friction and bearing loading advantages only achieved with a unipivot tone arm. In conjunction with the fluid damping of the unipivot, the system provides a rigid platform in the rotational "azimuth"mode resulting in superior image (perceived instrument placement) stability. Since this system can be easily adjusted, precise and stable azimuth adjustment of the tone arm is possible.

A specific embodiment example of a version of the invention comprises the first magnet 44 and the second magnet 46 made of rare earth materials. The first magnet 44 has a cylindrical shape with an inverted conic face oriented toward the second magnet 46. The second magnet 46 has a cylindrical shape with a flat face toward the first magnet 44. The support member 48 is made of a horizontal and a vertical aluminum structure. The horizontal structure employs a precision ball-bearing assembly with an ABEC 7 rating to allow rotation free about the tone arm base 54. At the end opposite the rotating end, the vertical structure is slideably mounted on the horizontal structure with the position held in place by screw mechanism after adjustment to achieve the desired magnetic attraction force. The vertical or azimuth position of the second magnet 46 is control by a screw-type vernier adjustment.

A specific embodiment example of a version of the invention comprises the first magnet 44 and the second magnet 46 made of rare earth materials. The first magnet 44 has a cylindrical shape with an inverted conic face oriented toward the second magnet 46. The second magnet 46 has a cylindrical shape with a flat face toward the first magnet 44. The support member 48 is made of a horizontal and a vertical aluminum structure. The horizontal structure employs a precision ball-bearing assembly with an ABEC 7 rating to allow rotation free about the tone arm base 54. At the end opposite the rotating end, the vertical structure is moveably mounted on the horizontal structure with the position held in place by screw mechanism after adjustment to achieve the desired magnetic attraction force. The vertical or azimuth position of the second magnet 46 is control by a screw-type vernier adjustment.

Although the present invention has been described in considerable detail with reference to certain preferred versions thereof, other versions are possible. All the features disclosed in this specification (including the accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function is not to be interpreted as a "means" clause as specified in 35 U.S.C. §112, ¶6.

What is claimed is:

1. A stabilizer for stabilizing a movement of a provided tone arm, wherein the tone arm includes a housing assembly and a base having an axis, the housing assembly couples to the base and rotates around the axis, the stabilizer comprising:
    a support;
    a first magnet; and
    a second magnet; wherein:
        the support couples to the base and rotates around the axis;
        the first magnet couples to the housing assembly;
        the second magnet couples to the support;
        the first magnet is separated from the second magnet by a gap of air;
        a magnetic flux across the gap attracts the second magnet to a position proximate to the first magnet thereby rotating the support relative to the housing assembly to stabilize the movement of the tone arm.

2. The stabilizer of claim 1 wherein the vertical position of the second magnet is moveably mounted on the support to control an azimuth of a magnetic field that attracts the second magnet to the first magnet.

3. The stabilizer of claim 1 wherein the horizontal position of the second magnet is moveably mounted on the support to control a magnitude of a force of a magnetic attraction of the second magnet on the first magnet.

4. A stabilizer for stabilizing a movement of a provided tone arm, wherein the tone arm includes a housing assembly, a base having a first axis, and a gantry, the housing assembly couples to the base and rotates around the first axis, the stabilizer comprising:
    a support;
    a first magnet;
    a second magnet;
    a pulley wheel;
    a pivoting arm having a first end and a second end;
    a pivot point having an second axis;
    a pulley drive belt having a first end and a second end;
    a counterweight; and
    a rod; wherein:
        the support couples to the base and rotates around the first axis;
        the first magnet couples to the housing assembly;
        the second magnet couples to the support;
        the first magnet is positioned proximate to the second magnet across a gap of air;
        the pulley wheel couples to the first end of the pivoting arm;
        the second end of the pivoting arm couples to the pivot point and rotates around the second axis;
        the pivot point couples to the gantry;
        the first end of the pulley drive belt couples to the support;
        the second end of the pulley drive belt couples to the gantry;
        the counterweight moveably couples to the rod along a length of the rod;
        the rod couples to the pivot point thereby stabilizing the movement of the tone arm.

5. The stabilizer of claim 4 wherein the vertical position of the second magnet is moveably mounted on the support to control an azimuth of the magnetic field that attracts the second magnet to the first magnet.

6. The stabilizer of claim 4 wherein the horizontal position of the second magnet is moveably mounted on the support to control a magnitude of a force of a magnetic attraction of the second magnet on the first magnet.

7. A stabilizer for stabilizing a movement of a provided tone arm, wherein the tone arm includes a housing assembly and a base, the housing assembly rotationally couples to the base, the stabilizer comprising:
   a support that rotationally couples to the base and is positioned in concentric rotational alignment with the housing assembly;
   a first magnet having a first pole and a second pole; and
   a second magnet having a third pole and a fourth pole;
   wherein:
      the first pole couples to the housing assembly;
      the third pole couples to the support;
      the second pole is positioned proximate the fourth pole separated by a gap of air;
      the second pole magnetically attracts the fourth pole across the gap to stabilize the movement of the tone arm.

8. The stabilizer of claim 7 wherein the vertical position of the second magnet is moveably mounted on the support to control an azimuth of the magnetic field that attracts the fourth pole of the second magnet to the second pole of the first magnet.

9. The stabilizer of claim 7 wherein the horizontal position of the second magnet is moveably mounted on the support to control a magnitude of a force of a magnetic attraction of the fourth pole of the second magnet on the second pole of the first magnet.

10. A method performed by a stabilizer for stabilizing a movement of a tone arm, the method comprising:
   detecting a magnetic attraction;
   rotating a support relative to a tone arm housing assembly in response to detecting;
      wherein:
         a first magnet couples to the tone arm housing assembly;
         a second magnet couples to the support;
         the first magnet is separated from the second magnet by a gap of air;
         a magnetic flux across the gap attracts the second magnet to a position proximate to the first magnet thereby rotating the support relative to the tone arm housing assembly to stabilize the movement of the tone arm.

11. The method of claim 10 wherein detecting comprises the first magnet detecting a magnetic flux from the second magnet.

12. The method of claim 10 wherein rotating comprises rotating the support in such a way that the first magnet is positioned facing the second magnet.

13. The method of claim 10 further comprising damping a rotation of the support relative to a tone arm gantry.

* * * * *